Figure 1:
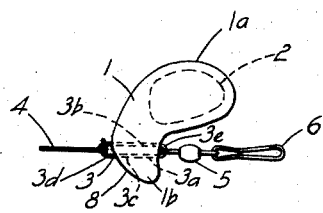

May 19, 1959     I. S. MACDONALD     2,886,915
DEVICES FOR USE IN SPINNER BAIT FISHING
Filed June 6, 1955     2 Sheets-Sheet 1

INVENTOR
IAN SINCLAIR MACDONALD
By Young, Emery & Thompson
ATTYS.

May 19, 1959      I. S. MACDONALD      2,886,915

DEVICES FOR USE IN SPINNER BAIT FISHING

Filed June 6, 1955      2 Sheets-Sheet 2

INVENTOR
IAN SINCLAIR MACDONALD
By Young, Emery & Thompson
ATTYS

United States Patent Office 2,886,915
Patented May 19, 1959

2,886,915

DEVICES FOR USE IN SPINNER BAIT FISHING

Ian Sinclair Macdonald, Dunedin, New Zealand

Application June 6, 1955, Serial No. 513,446

3 Claims. (Cl. 43—43.13)

This invention relates to devices for use in spinner bait fishing, to ensure effective operation of the swivel between the fishing line and the spinner bait and thus counteract twisting of the line due to rotation of the spinner bait.

Modern light lines tend to twist when swivels alone are used without keel members as friction in the swivel bearings is greater than the resistance of the line itself to rotation in the water about the axis of pull when the keel member and spinner bait are being drawn through the water in use.

Various forms of keel members have been devised for use between the fishing line and a swivel connected in turn to the spinner bait. Some keel members are made of a transparent material which is substantially invisible to the fish. However, they are then usually about the same specific gravity as the water throughout their depth, and they therefore rely principally on their shape to resist rotation and, while some shapes may give a greater resistance to rotation than others, in general their resistance to rotation is in relation to their size, and some shapes of keel members in order to be effective must be of considerable size.

Other keel members rely on the fact that their specific gravity exceeds that of the water through which they are drawn, such a keel member being usually made entirely of lead and mounted so that its centre of gravity is eccentric relatively to the axis of the line. In use, such a keel member is disposed in the dependent position and relies for its operation on the eccentricity of the weight making it difficult for the spinning action of the spinner bait to pivot the dependent weight upwards about the axis of pull. However, the material of which the keel member is made is opaque, which is undesirable, it being recognized that keel members should be substantially invisible to the fish. The excessive weight of such a keel member also renders it undesirable in modern spinning, light bait casting and light surf casting, light weight of all of the fishing tackle being very important, and the only item of the tackle which should possess weight being the spinner bait and not the keel member.

The principal object of the present invention is to provide a further factor to resist rotation about the axis of pull, thus enabling the use of a small light-weight keel member of low visibility, which will give a resistance to rotation greater than its small size and weight would normally provide.

Accordingly the invention consists in a device of use in spinner bait fishing, to ensure effective operation of the swivel between the fishing line and the spinner bait and thus counteract twisting of the line due to rotation of the spinner bait, comprising a substantially transparent streamlined keel member adapted in use to be interposed between the fishing line and the said swivel, the said keel member comprising a mounting part adapted to be mounted to the fishing tackle between the line and the said swivel, a streamlined stabilizing part provided with stabilizing means, which in use are out of line with the axis of pull and which through their specific gravity being substantially different from that of the body of the keel member, tend to cause the keel member to remain substantially vertical when it is in the water, and a substantially streamlined connecting part forming a connection between the mounting part and the stabilizing part.

The said stabilizing means may comprise a buoyant pocket disposed out of line with the axis of pull, so that the resulting buoyancy of the stabilizing part of the keel member in relation to the body of the keel member will result in it tending to remain uppermost when the keel member is in the water. Alternatively the said means may comprise a weight disposed out of line with the axis of pull, so that the resulting greater specific gravity of the stabilizing part of the keel member in which it is disposed, in relation to the body of the keel member will result in it tending to remain lowermost when the keel member is in the water.

The invention also in its preferred form avoids clogging of the swivel.

Figure 2:
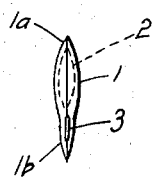
Figure 3:
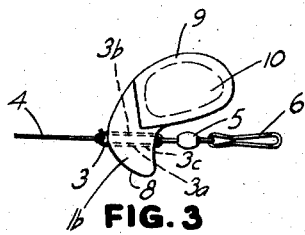
Figure 4:
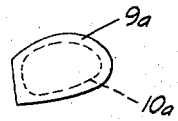
Figure 5:
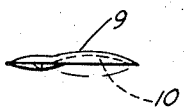
Figure 6:
Figure 7:
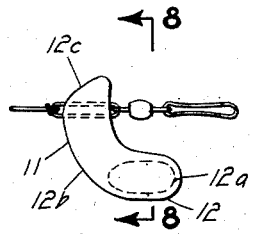
Figure 8:
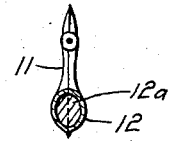
Figure 9:
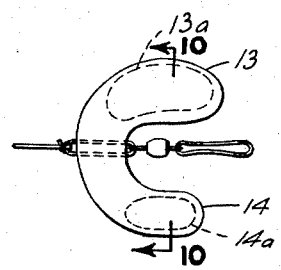
Figure 10:
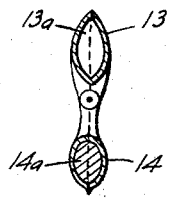

A preferred form of the invention, and some modifications thereof, will now be described with reference to the accompanying drawings, in which:

Figure 1 is a side elevation showing a preferred form of keel member according to the invention coupled to a line, swivel and connector for use in fishing tackle, the said keel member having an offset buoyant stabilizing part adapted to resist rotation of the keel member about the axis of pull, Figure 2 is an end view of the keel member shown in Figure 1, Figure 3 is a side elevation of the main piece of a keel member as shown in Figures 1 and 2, made according to a preferred method of manufacture, Figure 4 is a side elevation of the smaller piece of the keel member made according to the said preferred method, Figures 5 and 6 are plans corresponding with Figures 3 and 4 respectively, Figure 7 is a side elevation of an alternative form of keel member according to the invention, having an offset weighted stabilizing part to resist rotation about the axis of pull, Figure 8 is a section on the line 8—8 of Figure 7, Figure 9 is a side elevation of a further alternative form of the invention having a buoyant stabilizing part and an oppositely disposed weighted stabilizing part adapted together to resist rotation of the keel member about the axis of pull, and Figure 10 is a section on the line 10—10 of Figure 9.

In the construction shown in Figures 1 to 6 of the drawings, the keel member 1 is made of a transparent material such as a plastic material, with a specific gravity for example approximating that of water, or heavier if desired.

The keel member has stabilizing means comprising a completely enclosed buoyant pocket 2 disposed in a streamlined stabilizing part a distance above attachment means 3 by which the keel member is interposed between the line 4 and the associated swivel 5 and connector 6 for attachment to the spinner bait.

The above-mentioned attachment means 3 in the form shown comprise a double lay wire strand insert 3a with the swivel 5 attached thereto, the said attachment means being incorporated near the base of the keel member 1.

The wire strand is doubled back on itself and has both lays 3b and 3c partially embedded and spaced apart in the keel member and secured against withdrawal so as to obviate difficulties arising from rotation of the strand relatively to the keel member, and consequent twisting of the line, and so that loops 3d and 3e formed by the doubling back of the strand project at opposite ends of the lower part 1b for operatively associating the keel member with the line 4 and with the swivel 5 respectively.

Preferably the pocket 2 is charged with a suitable light gas such as air, hydrogen, or helium, all of which are transparent and very much lighter than water, the two last being very much lighter than air, though for practical reasons it is considered that air would be satisfactory for the purpose of the invention. Alternatively, the pocket can be evacuated to a desired degree.

The ideal of an overall specific gravity of 1 (water) or slightly over, so that the keel member does not tend to float or sink to any appreciable degree, can be attained in my invention with any tendency to rotate obviated or minimized.

This is achieved by disposing the buoyant stabilizing part 1a containing the pocket 2 in the upper part of the keel member and consequently out of line with the axis of pull, and this can be assisted by using metal of considerably greater specific gravity than that of water for the insert 3a. By the provision of the said insert, the streamlined lower mounting part 1b of the keel member is adapted to be connected to the line 4 and swivel 5.

The effect of the above construction is to provide a keel member having a buoyant upper stabilizing part 1a which has a strong tendency to remain uppermost, with the keel member substantially vertical, when immersed in the water, and which is integral with a lower mounting part 1b which in use tends to remain below the said upper part 1a.

The axis of pull passes through the relatively heavy lower mounting part 1b of the keel member which is weighted by the double lay insert 3a and associated swivel 5 and connector 6.

The keel member has its periphery sharpened or bevelled to facilitate its easy passage through the water.

The keel member is designed so that it can be used among weeds and other obstructions without either the keel member or the swivel being liable to entangle therewith. Accordingly when the keel member is used in association with a spinner bait designed for use among obstructions such as weeds, the fishing tackle can be used among weeds, scum and other hazards which could become entangled with other designs of equipment and render fishing difficult or impossible.

The buoyant upper stabilizing part 1a of the keel member is streamlined in relation to the direction of pull or travel in the water. This feature, and the substantially streamlined connecting part forming a connection of the stabilizing part 1a to the mounting part 1b, and its rearward offsetting or curving over the swivel from in front thereof, in relation to the direction of travel of the keel member in use, ensures that the associated swivel and connector are protected to an appreciable degree against engaging or entangling in weeds and other obstructions above the line. Also, the lower forward edge of the keel member is rounded to form a deflection arc 8, below the insert 3a, so that weeds and other obstructions coming into contact with the lower part of the keel member are deflected downwards away from the associated swivel and spinner bait connector 6, thus providing protection for the swivel and connector from below.

By the above described shaping and location of the keel member, in use the swivel is protected from being fouled in its effective operation by weeds and other obstructions or matter (including sand or grit), which could otherwise interfere with operation of the swivel.

The keel member 1 may be made in various ways so as to provide the pocket 2.

According to the preferred method of manufacture shown in Figures 3 to 6, the keel member is made in two separate pieces 9 and 9a, each with an indentation 10—10a on its inner face, the two pieces 9 and 9a being joined and sealed together in any suitable way, such as by cementing, so that the indentations coact to form the pocket 2, Figures 1 and 2. The piece 9 is formed with the part 1b integral, accordingly the piece 9a is merely in the form of a hollow cap.

This mode of construction may be employed in manufacturing the keel member shown in Figures 1 and 2 of the drawings, and, with modifications where necessary, in manufacturing the keel member shown in Figures 7 to 10 of the drawings, to be later described.

Alternatively, the keel member may be made in one piece with wing-shaped bifurcations, each with an indentation on its inner face, the bifurcations, which are slightly separated during the initial forming, being subsequently fixed and sealed together, the indentations forming the pocket. This mode of construction can also be employed with the constructions shown in Figures 7, 8, 9 and 10 of the drawings.

In an alternative form of the invention, the keel member is moulded with a hole formed therein from one edge or side, the said hole forming the pocket and the outer end of the hole being suitably sealed such as by a plastic film or plug. This mode of construction can also be employed with the constructions shown in Figures 7, 8, 9 and 10 of the drawings.

In an alternative form of the invention, the keel member is moulded with a hole formed therein from one edge or side, the said hole forming the pocket and the outer end of the hole being suitably sealed such as by a plastic film or plug. This mode of construction can be employed with the constructions shown in Figures 1, 2, 7, 8, 9 and 10 of the drawings.

Alternatively, the pocket may be in the form of a bubble formed in a similar manner to that employed in glassblowing technique, this mode of construction being employed if desired in manufacturing the keel member shown in Figures 1 and 2 of the drawings, and for forming the air pocket 13a in the construction shown in Figures 9 and 10 of the drawings.

In the alternative construction shown in Figures 7 and 8 of the drawings, the keel member 11 is made of a substantially transparent material such as a plastic material with a specific gravity for example approximating that of water, and it has, in its offset lower stabilizing part 12, below the mounting part by which it is mounted to the fishing tackle, stabilizing means in the form of a weight 12a which may be moulded therein or placed therein in any other suitable way, and which may in effect be considered to be contained within a pocket in the stabilizing part of the keel member by which it is carried. The said stabilizing part of the keel member, as will be apparent from Figures 7 and 8, is offset or out of line with the axis of pull and is connected by a streamlined connecting part to the mounting part, so that the greater specific gravity of the said stabilizing part of the keel member in relation to the body of the keel member will result in it tending to remain lowermost when the keel member is in the water.

The weight 12a may be a lead weight, and in general it would be opaque, but its relatively small size would not greatly affect the visibility of the device, as the main body of the keel member is transparent. If desired, prior to insertion the lead weight can be painted a light colour such as white to reduce visibility.

In other respects, i.e. as regards shape and streamlining, the device is similar to that shown in Figures 1 to 6, and the lower curved edge 12b and the upper curved edge 12c tend to prevent entanglement of the device with weeds or other fouling matter below or above the device in use. The curving of the keel member under the swivel from in front thereof protects the swivel from being fouled in its effective operation by weeds and other obstructions or matter (including sand or grit).

The construction shown in Figures 9 and 10 embodies both an upper stabilizing part 13 with a pocket 13a and an opposite lower stabilizing part 14 with a weight 14a, the two stabilizing parts being similar in construction and function and in manner of connection to the tackle to the corresponding parts shown in Figures 1 to 8, and the device being correspondingly streamlined. The streamlined connecting part in this case connects both stabilizing parts to the mounting part.

With the latter form of the invention, the upper stabilizing part 13 containing the pocket 13a and the lower stabilizing part 14 containing the weight 14a operate together to counteract twisting of the line, while the upper and lower stabilizing parts 13 and 14 curving over and under the swivel from in front thereof protect the swivel from being fouled by weeds and other obstructions or matter.

In the alternative form of the invention shown in Figures 11 to 13, the weight 15 is partially embedded in the body 16 of the keel member. The said weight has a constriction 15a near its forward end 15b and an enlargement 15c in front of the said constriction, in order to key the forward part of the weight into the body 16 of the keel member from which the weight projects rearwards. The body 16 would in practice be formed about the forward part of the weight. The weight is elliptical in cross-section as shown in Figure 12.

In the alternative form of the invention shown in Figures 14 and 15, the weight 17 is attached to the body 18 of the keel member after forming of the said body. An elliptical hole 18a is provided through the body member during forming thereof, and a round or elliptical cross-section lead rivet 17a, shown in broken lines in Figure 15, is subsequently rivetted through the said hole between forming dies which form the opposite ends of the rivet into convex elliptical heads 17b which will create as little disturbance as possible when the keel member is drawn through the water. The medial part 17c of the rivet also has an elliptical cross section which will assist to key the weight against rotation in the hole.

With the present invention, the buoyant pocket on the one hand and the weight on the other hand in effect constitute stabilizing means, out of line with the axis of pull, which through their relative specific gravity in relation to the body of the keel member tend to cause the keel member to remain substantially vertical when it is in the water. In the one case the specific gravity of the buoyant pocket is relatively less than the specific gravity of the body of the keel member. In the case of the weight the opposite applies, the weight having a greater specific gravity than the body of the keel member.

The invention provides a keel member which is well adapted to the requirements of modern spinner bait fishing. It is light, substantially invisible, and because of its construction it is effective and reliable.

In operation, apart from the keel shape of the keel member resisting rotation about the axis of pull, where a buoyant pocket is used, as shown in Figures 1 to 6 of the drawings, the action of the said pocket is such that when the keel member is drawn through the water the offset upper stabilizing part of the said keel member being buoyant in relation to the body of the keel member, resists being pivoted downwards about the axis of pull by the rotary action of the spinner bait. Accordingly, due to the leverage effect of the distance between the centre of the pocket and the axis of pull, the keel member has a strong tendency to remain upright and the device ensures effective operation of the swivel and counteracts twisting of the line due to rotation of the spinner bait.

Owing to the lightness of the body of the keel member shown in Figures 7 and 8, and the distance from the axis of pull to the centre of gravity of the weight, the keel member can be made considerably smaller and lighter than is possible with existing lead keel members in which the entire keel member is made of lead. Furthermore, instead of the entire keel member being readily visible to the fish, as in the case of existing lead keel members, only a small part of it is visible, this being especially so with the bullet or oval shape of weight shown in the drawings.

Where both a weighted stabilizing part and an opposite buoyant stabilizing part are employed, as shown in Figures 9 and 10 of the drawings, the combined mechanical advantages of both of the other constructions are attained, giving a greater resistance to twisting of the line. Furthermore, as the weight offsets the buoyant pocket, the overall specific gravity of the device can be readily controlled during manufacture to give a specific gravity of for example just over 1.

The device in the various forms shown herein, can be designed to counteract twisting forces of various magnitudes.

In cases where the twisting force is substantial, for example with large deep sea spinner baits or spinner baits for salmon, a keel member with a large buoyant pocket and/or weight, and/or with a considerable offset of the buoyant pocket and/or weight from the axis of pull, can be employed to give a greater leverage and thus resist to a greater degree pivoting of the stabilizing part or parts of the keel member carrying the buoyant pocket and/or weight down or up about the axis of pull. With a buoyant pocket construction, where a larger pocket is employed, a heavier insert 3a (Figures 1 and 3) can be used to maintain a desired overall specific gravity of for example slightly over 1.

I claim:

1. A device for use in spinner bait fishing, to ensure effective operation of the swivel between the fishing line and the spinner bait and thus counteract twisting of the line due to rotation of the spinner bait, comprising a substantially transparent streamlined keel member adapted in use to be interposed between the fishing line and the said swivel, the said keel member comprising a mounting part adapted to be mounted to the fishing tackle between the line and the said swivel, a streamlined stabilizing part forming a part of the keel member, said stabilizing means including a buoyant gas filled pocket which is in the upper portion of the keel member and out of line with the axis of pull, so that the resulting buoyancy of the said stabilizing part in relation to the body of the keel member will result in it tending to remain uppermost when the keel member is in the water, and a substantially streamlined connecting part forming a connection between the mounting part and the stabilizing part, said keel member having a leading convex edge which extends a susbtantial distance above and below the axis of pull and the upper portion of the said keel member extending back a substantial distance from the terminal part of the lower portion.

2. A device according to claim 1, in which the gas in the buoyant pocket is air.

3. A device according to claim 1, in which a weight is provided in the lower portion of the keel member to increase the stabilizing effect of the device.

References Cited in the file of this patent

UNITED STATES PATENTS

| 1,795,205 | Fenderson | Mar. 3, 1931 |
| 2,085,096 | Hansen | June 29, 1937 |
| 2,115,375 | Warner | Apr. 26, 1938 |
| 2,119,504 | Lawrence | May 31, 1938 |
| 2,173,540 | Rayburn | Sept. 19, 1939 |
| 2,219,886 | Blomme | Oct. 29, 1940 |
| 2,596,201 | Bocchino | May 13, 1952 |
| 2,769,271 | Smith | Nov. 6, 1956 |

FOREIGN PATENTS

| 1,135 | Great Britain | 1889 |
| 150,418 | Australia | Mar. 5, 1953 |
| 659,706 | Great Britain | Oct. 24, 1951 |
| 739,872 | Great Britain | Nov. 2, 1955 |